United States Patent
Munn et al.

(10) Patent No.: US 11,792,096 B1
(45) Date of Patent: Oct. 17, 2023

(54) METHOD AND SYSTEM FOR PREDICTIVE AND FEEDBACK MANAGEMENT OF NETWORK PERFORMANCE

(71) Applicant: Verizon Patent and Licensing Inc., Basking Ridge, NJ (US)

(72) Inventors: Jude M. Munn, Pittsburg, CA (US); David Taft, Keller, TX (US); Anthony Clay Reynolds, Rhome, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/934,621

(22) Filed: Sep. 23, 2022

(51) Int. Cl.
*H04L 41/0816* (2022.01)
*H04L 43/091* (2022.01)
*H04L 43/065* (2022.01)
*H04L 43/0817* (2022.01)

(52) U.S. Cl.
CPC ........ *H04L 43/065* (2013.01); *H04L 41/0816* (2013.01); *H04L 43/0817* (2013.01); *H04L 43/091* (2022.05)

(58) Field of Classification Search
None
See application file for complete search history.

(56) References Cited

U.S. PATENT DOCUMENTS

| | | | |
|---|---|---|---|
| 2020/0106858 A1* | 4/2020 | Huang | H04L 67/10 |
| 2020/0371893 A1* | 11/2020 | Bhorkar | H04L 43/0852 |
| 2021/0194782 A1* | 6/2021 | Jump | H04L 43/10 |
| 2021/0352534 A1* | 11/2021 | Tiwari | H04W 24/08 |
| 2022/0066901 A1* | 3/2022 | Bhorkar | H04L 41/5009 |
| 2022/0383265 A1* | 12/2022 | Dhumal | G06F 40/216 |
| 2023/0051449 A1* | 2/2023 | Froy | G07F 17/326 |

* cited by examiner

*Primary Examiner* — Joshua Joo (57) ABSTRACT

A method, a network device, and a non-transitory computer-readable storage medium are described in relation to a network performance and management service. The network performance and management service may include generating prospective network performance information pertaining to a network element and/or a geographic service area based on current network analytics information, network topology information, and crowd and test data. The prospective network performance information may include prospective performance metric values, probability, and confidence values. The network performance and management service perform a network modification when expected network performance information requirements may not be met.

20 Claims, 7 Drawing Sheets

METHOD AND SYSTEM FOR PREDICTIVE AND FEEDBACK MANAGEMENT OF NETWORK PERFORMANCE

BACKGROUND

Network performance and network management present various complexities due to the enumerable relevant factors to consider as well as their dynamic nature. Additionally, given the dynamic nature of network performance over time, the provisioning and management of resources in the network are equally challenging.

DETAILED DESCRIPTION

The following detailed description refers to the accompanying drawings. The same reference numbers in different drawings may identify the same or similar elements. Also, the following detailed description does not limit the invention.

The performance of a network may be reliant on multiple networks, such as a radio access network (RAN), a core network, an application service layer network, an X-haul network, and/or another type of network. Additionally, the performance of the network in view of various performance metric criteria (e.g., latency, throughput, bitrate, error rate, and the like) may be dependent on enumerable criteria and factors, such as configuration and resources of a network slice, radio quality, cell-level congestion, configuration and resources associated with RAN, core, and/or application service layer devices, reaction to dynamism in the RAN and/or the core network, scheduling and priority of traffic, transport configurations, among other things. Given the complexities of provisioning and prospectively maintaining performance metric values, services, service level agreement (SLA) requirements, and/or the like, network performance systems may be configured to underestimate prospective network performance capabilities. Additionally, network performance systems may not be able to accurately predict prospective network performance, services, SLA values, and/or the like based on the type of data available.

According to exemplary embodiments, a network performance and management service is described. According to an exemplary embodiment, the network performance and management service may use artificial intelligence (AI) logic and/or machine learning (ML) logic (AI/ML logic) to calculate prospective network performance information. According to an exemplary embodiment, the prospective network performance information may pertain to a network slice, an end-to-end network path, a network device, a segment of a network path or network slice (e.g., radio unit (RU) to user plane function (UPF), etc.), a geographic area associated with a network service (e.g., a cluster of RAN devices, a cell of a RAN device, a sector of a RAN device, a sub-sector of a RAN device, a customer site, a data center), and/or another type of network element, for example. According to an exemplary embodiment, the prospective network performance information may include a probability value associated with a network performance value and a confidence value associated with the probability value. According to an exemplary embodiment, the AI/ML logic may use network topology information, crowd sourced data, testing data, and current performance metric value information to calculate the prospective network performance information, as described herein.

According to an exemplary embodiment, the network performance and management service may provide the prospective network performance information to a network provisioning system. The network provisioning system may or may not modify the allocation of network resources and/or configurations at a local level or non-local level based on the prospective network performance information. The network provisioning system may use expected performance metric information to determine whether a network modification should be executed, as described herein.

According to various exemplary embodiments, the network performance and management service may be applied to network elements and/or geographic areas associated with existing users or prospective users. For example, according to an exemplary use case, the network performance and management service may facilitate the maintenance of network performance according to an SLA with an existing user based on the feedback system between the AI/ML logic and the network provisioning system. According to another exemplary use case, a prospective enterprise customer may wish to obtain network services satisfying certain performance metrics. The network performance and management service may be able to evaluate current state information, network topology, and other types of information, as described herein, associated with a geographic area (e.g., at an enterprise site or sites), determine a network performance, and output prospective network performance information that may be used to identify available SLA values to the prospective enterprise customer.

In view of the foregoing, the network performance and management service may enhance the accuracy of predicted network performance based on the diversified data upon which such prediction is based. Additionally, unlike current methods, the network performance and management service may enhance network modification decisions based on the probability and confidence values associated with prospective network performance parameters values. Further, the network performance and management service may improve the management of network performance at a network element or geographic service area level based on AI/ML models and the feedback system, as described herein.

Figure 1:
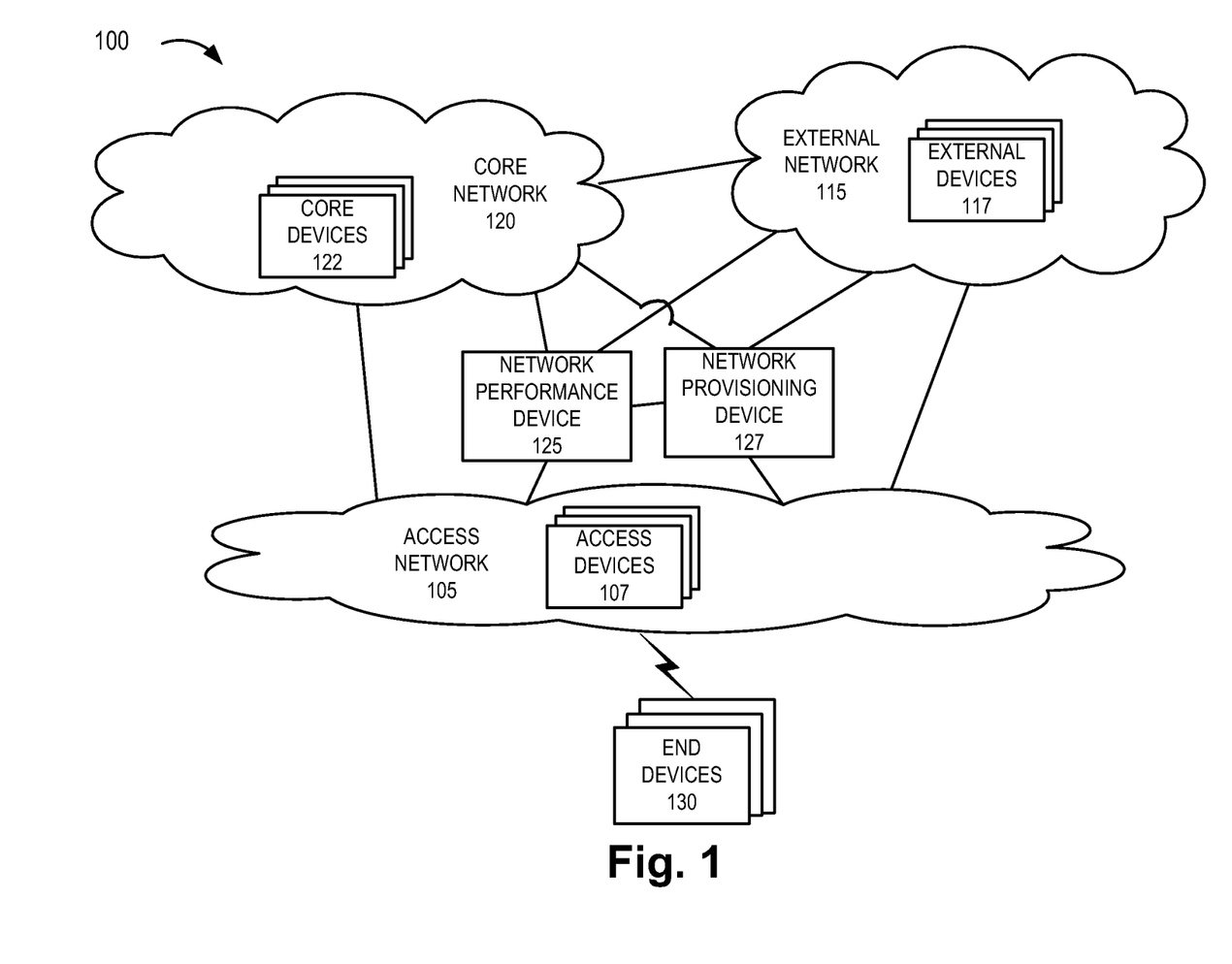
FIG. 1 is a diagram illustrating an exemplary environment in which an exemplary embodiment of a network performance and management service may be implemented.

FIG. 1 is a diagram illustrating an exemplary environment 100 in which an exemplary embodiment of a network performance and management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes a network performance device 125, a network provisioning device 127, and end devices 130 (also referred to individually or generally as "end device 130").

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary. For example, network performance device 125 and network provisioning device 127 may be combined in whole or in part as a single network device.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the network performance and management service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the network performance and management service logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network including an Evolved Packet Core (EPC) network and/or an NG core (NGC) network (not illustrated), or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector/zone, carrier, and/or other configurable level. For example, the sub-sector/zone level may include multiple divisions of a geographic area of a sector relative to access device 107. By way of further example, the sector may be divided based on proximity to the antenna of access device 107 (e.g., near, mid, far) and/or another criterion. According to another example, radio coverage of a location may be divided based on a Military Grid Reference System (MGRS) or another type of grid system to produce geo-bins. The size and/or shape of each geo-bin may be configurable. The size and/or the shape of a geo-bin may depend on the types of access device 107 (e.g., eNB versus gNB), attributes of access device 107 (e.g., antenna configuration, radio frequency band of beam, etc.), and/or other factors (e.g., terrain of the radio covered locale).

According to an exemplary embodiment, at least some of access devices 107 include logic of the network performance and management service, as described herein. For example, access device 107 may transmit and receive messages pertaining to the network performance and management service, as described herein. For example, access device 107 may provide state information pertaining to access device 107 and other RAN-based network elements (e.g., cell, sector, sub-sector/zone, network slice segment, radio bearer, QoS flow, PDU session, protocol layer, etc.) to network performance device 125. Additionally, for example, access device 107 may be provisioned by network provisioning device 127, as described herein.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130 (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the network performance and management service, as described herein. For example, external device 117 may transmit and receive messages pertaining to the network performance and management service, as described herein. For example, external device 117 may provide state information pertaining to external device 117 and other external network-based network elements (e.g., container, virtual machine, application service, network slice segment, etc.) to network performance device 125. Additionally, for example, external device 117 may be provisioned by network provisioning device 127, as described herein.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF) (which may include a NW-TT), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a TSCTSF, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the network performance and management service, as described herein. For example, core device 122 may transmit and receive messages pertaining to the network performance and management service, as described herein. For example, core device 122 may provide state information pertaining to core device 122 and other core-based network elements (e.g., QoS flow, network slice segment, session, protocol layer, etc.) to network performance device 125. Additionally, for example, access device 107 may be provisioned by network provisioning device 127, as described herein.

Network performance device 125 may include a network device that includes logic of the network performance and management service, as described herein. Although network performance device 125 is depicted outside of access network 105, external network 115, and core network 120, such an illustration is exemplary. According to other exemplary implementations, network performance device 125 may reside in one or multiple networks depicted and described herein. Additionally, network performance device 125 may be implemented in a centralized, distributed, and/or another type of network and/or computing architecture as a network device or system, as described herein.

According to an exemplary embodiment, network performance device 125 may include AI/ML logic that calculates prospective network performance information. The prospective network performance information may pertain to a network slice, an end-to-end network path, a network device, a segment of a network path or network slice, a geographic area associated with a network service, and/or another type of network element, for example.

Network performance device 125 may use static and dynamic network information pertaining to a network subject to the network performance and management service. For example, network performance device 125 may store or have access to network topology information. For example, the network topology information may indicate the type, number, and placement of access devices 107, external devices 117, and core devices 122. The network topology information may include network device identifiers, network slice identifiers, and/or other types of unique identifiers. The network topology information may indicate connectivity information pertaining to network devices and other types of network elements (e.g., logical, virtual, network slices, links, etc.) of a network. The network topology information may include information relating to components of access devices 107, such as antennas (e.g., height, number, type, gain, transmit loss, receive loss, receive signal, fade margin (e.g., thermal, effective, etc.), and other characteristics (e.g., carrier frequencies, frequency bands, cells, radio access technology (RAT), cell coverage, sector coverage, sub-sector/zone coverage) and configurations (e.g., CA, DC, CoMP, etc.).

The network topology information may indicate placement of a network device according to geographic coordinates (e.g., latitude/longitude values, azimuth values) of a geographic coordinate system (GCS), or coordinate values associated with another type of coordinate system (e.g., a projected coordinate system (PCS), etc.). The network topology information may include map information. For example, the map information may indicate a geographic area (e.g., country, state, county, city, town, province, etc. The network topology information may include Voronoi-based area (e.g., a cell, a sector, a zone/sub-sector, etc.), geo-bin area, and/or another division of a geographic area representative of radio coverage, network service coverage, service area of core device 122, and so forth.

Network performance device 125 may obtain current analytics information. For example, the current analytics information may include performance metric parameters and values relating to network elements and/or geographic areas within which a service is provided. According to an exemplary embodiment, network performance device 125 may obtain the current analytics information from an NWDAF. According to other exemplary embodiments, network performance device 125 may obtain current analytics information from another type of device that may provide real-time analytics data.

According to various exemplary embodiments, the performance metric parameters and values may include key performance indicators (KPIs), Quality of Service (QoS) parameters and values, Quality of Experience (QoE) parameters and values, SLA parameters and values, and/or Mean Opinion Score (MOS) parameters and values. A performance metric value may be implemented as a single value (e.g., X) or a range of values (e.g., X to Y). The performance metric value may also be associated with a time period (e.g., seconds, hour(s), day(s), and/or another time period), may indicate an average value, a mean value, and/or another statistical value. By way of further example, the performance metric information may relate to the performance associated with user sessions, connections, channels, messaging, a network procedure (e.g., attachment, handover, session establishment, local breakout, dual connectivity, etc.), application services, and/or other types of metrics in relation to a network element and/or a geographic area associated with a service. The performance metric information may relate to user plane or user plane and control plane events or metrics. As an example, the performance metric information may include information relating to Radio Resource Control (RRC) setup failures, handover attempts, handover failures, radio bearer drops, uplink and/or downlink throughput, voice call drops, random access failures, data volume (e.g., maximum, minimum, etc.), latency, packet error, delay, bit rates (e.g., guaranteed, maximum, minimum, burst, etc.), jitter, retries, 5G QoS Class Identifiers (QCIs) and characteristics, and so forth.

According to an exemplary embodiment, network performance device 125 may obtain other types of data as a basis to calculate prospective network performance information, as described herein. For example, the other types of data may include crowd sourced data and testing data. For example, crowd sourced data may include network source data, such as speed test data associated with a speed test server, and/or end device/user data, such as network performance data stemming from end devices 130 (e.g., client application, mobile application) that may be reported by users/end devices 130. Additionally, network performance device 125 may obtain testing data from testing devices, which may be situated at different locations, that may measure network performance. For example, a testing device may perform testing for throughput, latency, and/or another performance metric associated with a geographic area (e.g., a factory with robotic devices, a cell site, etc.).

According to an exemplary embodiment, network performance device 125 may use the network topology information, crowd sourced data, and current performance metric value information, and other types of data, as described herein, to calculate the prospective network performance information. According to an exemplary embodiment, network performance device 125 may calculate one or more values of the prospective network performance information, as described herein, based on expected performance metric values for the network elements and/or the geographic areas. For example, a network element and/or a geographic area may be subject to satisfying a performance metric parameter and value according to an SLA.

According to an exemplary embodiment, the prospective network performance information may include a probability value associated with a network performance value. For example, network performance device 125 may calculate a probability value between 0 and 1. According to an exemplary embodiment, network performance device 125 may also calculate a confidence value associated with the probability value. For example, the confidence value may indicate a reliability, confidence, accuracy, and/or trustworthiness of the probability value. For example, the confidence value may be implemented as a value between 0 and 1, a percentage (e.g., 0-100), or similarly applicable values.

According to some exemplary embodiments, network performance device 125 may calculate the confidence value based on various criteria. For example, the criteria may include the amount and/or duration of historical prospective network performance information (e.g., predicted performance metric value and resulting or actual performance metric value) in relation to the network slice, network device, etc., of relevance to which the probability value pertains. The criteria may include the type of network element (e.g., network device versus network slice versus portion of an end-to-end path, etc.) to which the probability value pertains. For example, a single network element (e.g., a zone, a sector, a network device, etc.) versus a network element comprising multiple network elements (e.g., a network slice, a RAN and core network segment) may be considered when calculating the confidence value.

According to an exemplary embodiment, network performance device 125 may provide the prospective network performance information to network provisioning device 127. According to various exemplary embodiments, network performance device 125 may be configured to calculate and provide the prospective network performance information according to a time schedule, or based on other criteria (e.g., reactively, proactively, etc.). Network performance device 125 may publish the prospective network performance information on a service bus, provide to third party devices of an application service layer network via a NEF, and/or provide to other types of network systems, such as an operations support system (OSS), a business support system (BSS), a network management system, an orchestrator, a radio intelligent controller (MC), a virtualization management system, or the like, for use by third party devices and/or non-third party devices.

Network provisioning device 127 may include a network device that includes logic of the network performance and management service, as described herein. Although network provisioning device 127 is depicted outside of access network 105, external network 115, and core network 120, such an illustration is exemplary. According to other exemplary implementations, network provisioning device 127 may reside in one or multiple networks depicted and described herein. Additionally, network provisioning device 127 may be implemented in a centralized, distributed, and/or another type of network and/or computing architecture as a network device or system, as described herein.

According to an exemplary embodiment, network provisioning device 127 may or may not modify the allocation of network resources and/or configurations at a local level or non-local level based on the prospective network performance information obtained from network performance device 125. For example, network provisioning device 127 may compare expected performance metric information with the prospective network performance information to determine whether a network modification should be executed or not. As an example, when the prospective network performance information satisfies or exceeds the expected performance metric information, network provisioning device 127 may determine to not modify network resources and/or configurations. Network provisioning device 127 may make this determination based on policies and/or rules that may account for not only the prospective metric parameters and values but also the probability values and confidence values. Alternatively, network provisioning device 127 may modify the allocation of network resources and/or configuration associated with the network element when the prospective network performance information exceeds the expected performance metric information. For example, network provisioning device 127 may reduce the allocation of resources and/or adjust a configuration associated with the network element(s) of relevance. Further for example, when the prospective network performance information fails to satisfy the expected performance metric information, network provisioning device 127 may determine to modify network resources and/or configuration so as to satisfy or sustain the expected performance metric. Alternatively, for example, depending on the probability and/or confidence values, network provisioning device 127 may determine to not modify the network resources and/or configuration. In either case, the network performance and management service may enable network provisioning device 127 to tune one or multiple network elements towards achieving and sustaining expected performance metrics associated with an SLA based on this feedback (e.g., negative or positive) system.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or other type of wireless device (e.g., other type of UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 may include logic of the network performance and management service, as described herein. For example, end device 130 may transmit and receive messages pertaining to the network performance and management service, as described herein. For example, end device 130 may provide state information pertaining to end device 130 and other end device-based network elements (e.g., QoS flow, network slice segment, PDU session, protocol layer, application service, network slice, etc.) to network performance device 125. Additionally, for example, end device 130 may be provisioned by network provisioning device 127, as described herein.

Figure 2:
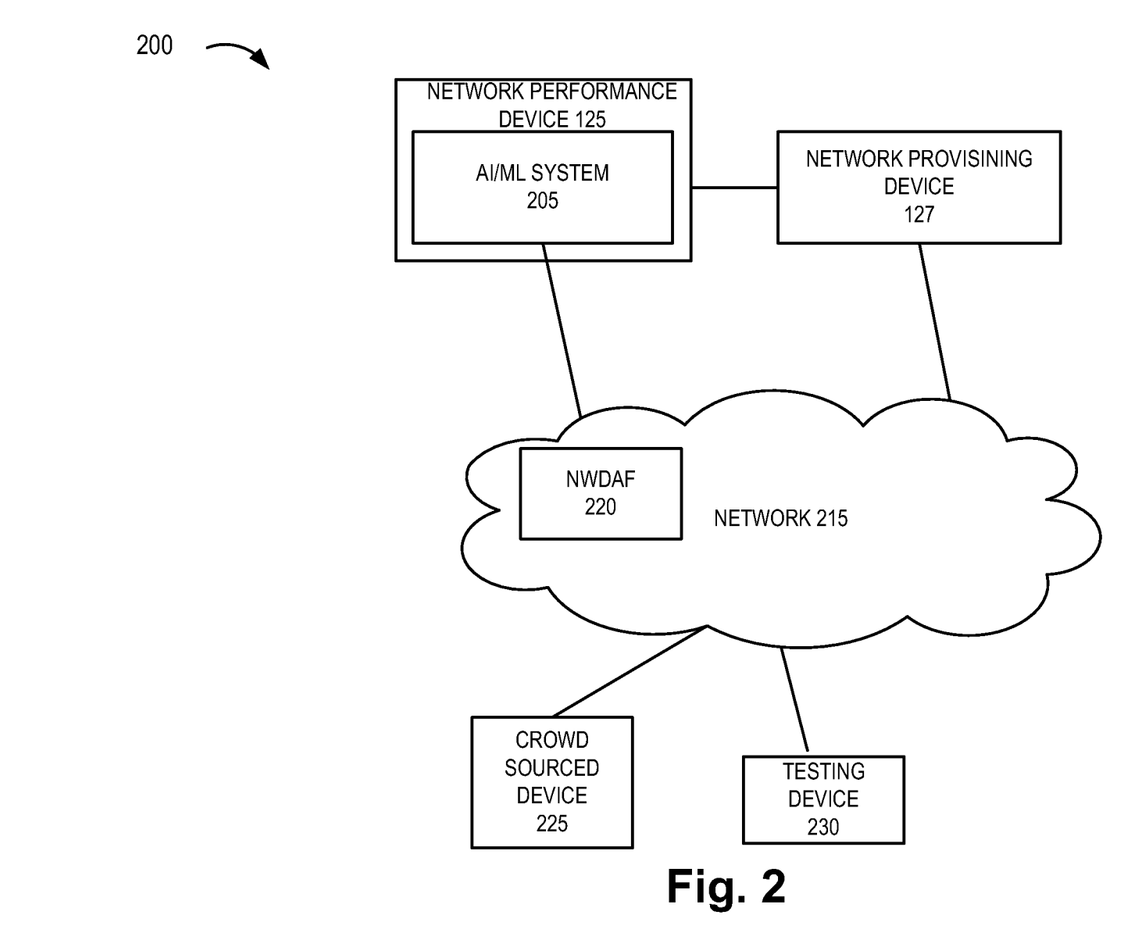
FIG. 2 is a diagram illustrating another exemplary environment in which an exemplary embodiment of the network performance and management service may be implemented.

FIG. 2 is a diagram illustrating another exemplary environment 200 in which an exemplary embodiment of the network performance and management service may be implemented. As illustrated, environment 200 may include a network performance device 125, a network provisioning device 127, a network 215, an NWDAF 220, a crowd sourced device 225, and a testing device 230. Similar to the description of environment 100, the number, type, and arrangement of network devices, end devices 130, communication links, and so forth, may be different in other embodiments.

Network performance device 125 may include an AI/ML system 205, as described herein. AI/ML logic 205 may include one or multiple types of predictive models. For example, the predictive models may include a time series model, a forecast model, a clustering model, and/or a classification model. The predictive models may include a tree-based algorithm, a regressive algorithm, and/or another type of AI/ML algorithm or logic, such as Naïve Bayes, K-Nearest Neighbors, decision tree, Random Forest, gradient boosting, support vector machine, clustering via embedding, a dense neural network, a convolutional neural network, a recurrent neural network, and/or the like. AI/ML system 205 may calculate prospective network performance information pertaining to a network element and/or a geographic area based on network topology information, current performance metric value information, crowd sourced data, test data, and other types of data, as described herein.

Network provisioning device 127 may include logic that provides a network performance and management service. For example, network provisioning device 127 may include logic that calculates for the provisioning, configuration, and modification of various types of network elements and/or scopes of geographic areas based on the prospective performance metric information. According to an exemplary embodiment, network provisioning device 127 may compare expected performance metric information with the prospective performance metric information (e.g., performance metric parameters and values, probability values, confidence values, etc.). Based on a result of the comparison, network provisioning device 127 may determine whether network performance associated with a network element and/or a geographic area satisfies an expected network performance. Network provisioning device 127 may also use policies/rules, historical network performance information, network dependency information associated with a network (e.g., access network 105, core network 120, etc.), a network device (e.g., access device 107, core device 122, etc.), a network slice (e.g., 5QIs, etc.), a segment of a network slice, application services, and various network elements, as described herein, to make this determination. For example, for a determination relating to a sector or sub-sector area of a cell site, the network dependency information may include the type of end device 130 and associated capabilities (e.g., IoT device versus smartphone), parameters associated with access device 107 of relevance, connection (e.g., SA, NSA, etc.), transport information (e.g., differentiated services code point (DSCP), type of service (ToS), or the like), service classification (e.g., fixed, mobile, IoT, etc.), core devices 122 of relevance, network slice information (5QI, etc.), external device 117 of relevance, the application service (e.g., VR versus web browsing), and so forth.

According to an exemplary embodiment, network provisioning device 127 may include AI/ML logic that identifies parameters and generates templates that enable the provisioning of network resources and configurations such that expected network performance may be optimally modified when prospective network performance may underperform or when prospective network performance may overperform. The AI/ML logic may compare historical data sets to current network conditions as a basis for selection of a template and associated parameters and values that may be used.

Network 215 may include access network 105, core network 120, external network 115, and/or other types of networks, as described herein. NWDAF 220 may provide a function and/or a service in accordance with a network standard (e.g., 3GPP, 3GPP2, ITU, ETSI, GSMA, and/or the like) and/or of a proprietary nature. For example, NWDAF 220 may collect data from network devices and operations, administration, and maintenance (OAM) systems across one or multiple networks or domains (e.g., core, cloud, etc.) via standard interfaces of a service-based architecture. NWDAF 220 may obtain data (e.g., statistics, metric values, events, etc.) from such devices/networks and may provide data analytics functions that may be configured by a network operator, for example. Additionally, for example, NWDAF 220 may include logic of an exemplary embodiment of the network performance and management service, as described herein. For example, NWDAF 220 may obtain current state information, which may include current performance metric information, for various types and granularities of network elements, geographic areas, and time periods (e.g., seconds, hour(s), day(s), and/or another time period) across one or multiple networks, geographic service areas, and virtual/logical domains. NWDAF 220 may generate current network analytics information and provide the current analytics information, which may include current performance metric parameters and values, as described herein, to network performance device 125/AI/ML system 205. The current analytics information may include current performance metric parameters and values. The current performance metric value may be implemented as a single value (e.g., X) or a range of values (e.g., X to Y). The current performance metric value may also be associated with a time period, may indicate an average value, a mean value, and/or another statistical value. The current performance metric value may also be associated with a network element and/or a geographic service area, as described herein.

Crowd source device 225 may be implemented as end device 130. For example, crowd source device 225 may include an application (e.g., a client application, a mobile application, a browser, or another type of software) which may collect or obtain data from a user relating to a network performance. For example, the data may include speed test data, user experience data (e.g., rating) pertaining to the performance of an application or application session, and/or another type of device or user-based data pertaining to performance associated with a network element and/or geographic area, as described herein.

Testing device 230 may be implemented as end device 130 or a network device. Testing device 230 may be operated or controlled by an entity other than a user/subscriber, such as a network operator/administrator. Testing device 230 may generate data indicative of or pertaining to performance of a network element and/or associated with a geographic service area. For example, testing device 230 may perform testing for throughput, latency, and/or another performance metric associated with a geographic area (e.g., a factory with robotic devices, a cell site, etc.).

Figure 3A:
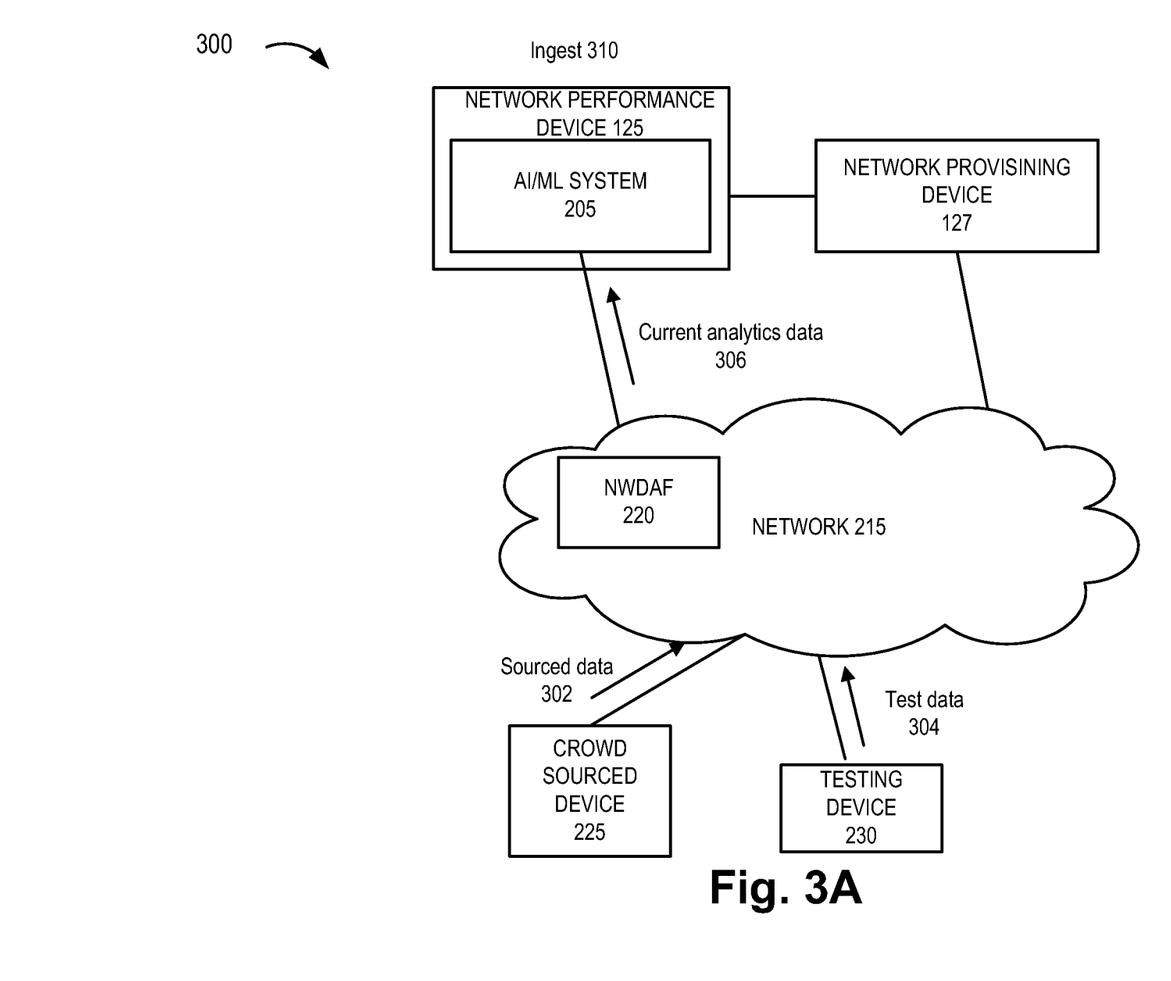
FIGS. 3A-3C are diagrams illustrating an exemplary process of an exemplary embodiment of the network performance and management service.
Figure 3B:
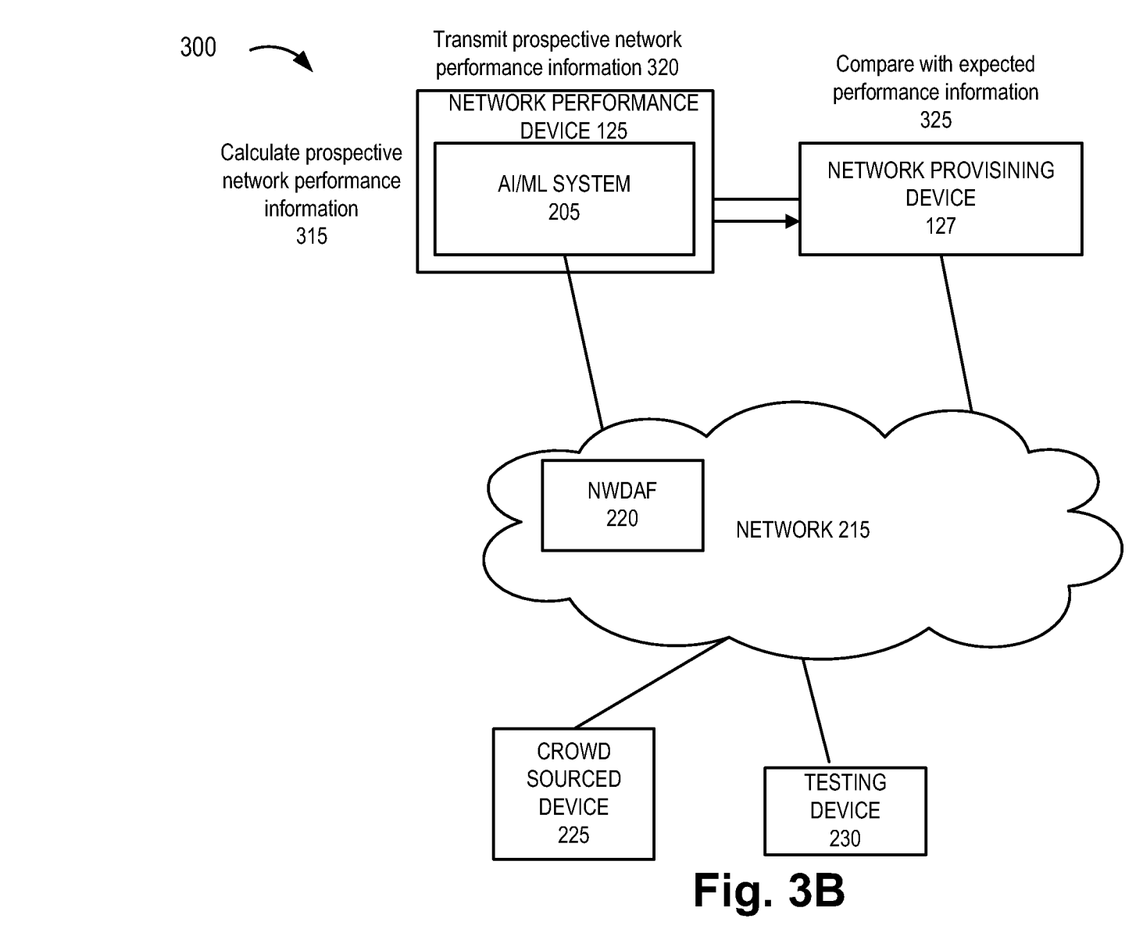
Figure 3C:
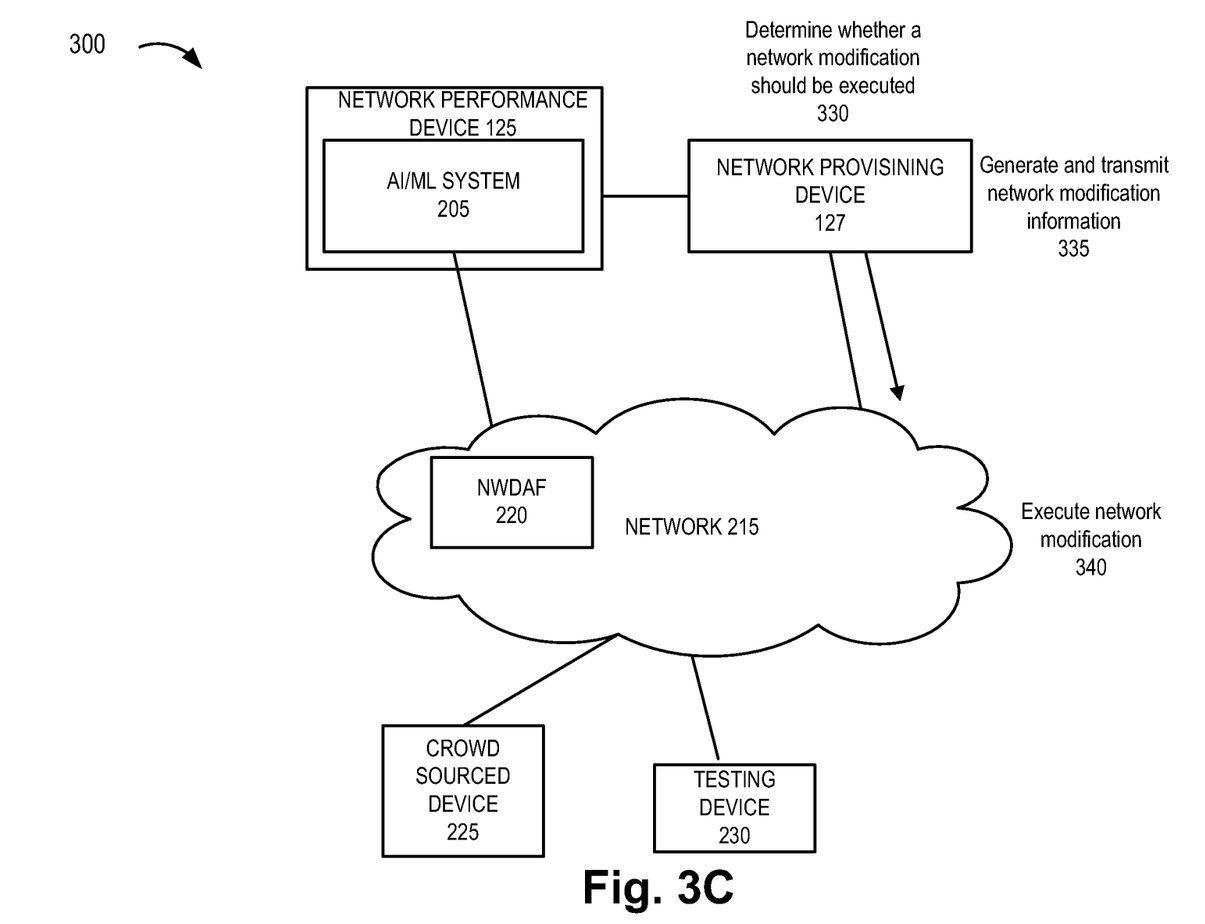

FIGS. 3A-3C are diagrams illustrating an exemplary process 300 of an exemplary embodiment of the network performance and management service. As illustrated, referring to FIG. 3A, network performance device 125 may ingest 310 data obtained from crowd sourced device 225 (e.g., sourced data 302), testing device 230 (e.g., test data 304) and NWDAF 220 (e.g., current analytics data 306). According to other exemplary scenarios, network performance device 125 may obtain fewer instances of data, such as only current analytics data 306, or current analytics data 306 and test data 304, etc. Referring to FIG. 3B, AI/ML system 205 may calculate prospective network performance information 315 based on the obtained data. For example, AI/ML system 205 may identify one or multiple network elements and/or a geographic area of relevance that pertain to the obtained data. AI/ML system 205 may also account for time period information, as described herein. As an example, according to an exemplary scenario, the prospective network performance information may pertain to a geographic area, such as a sub-sector associated with access device 107 of network 215. Additionally, or alternatively, according to an exemplary scenario, the prospective network performance information may pertain to a network slice or a segment of a network slice, which may or may not relate to the sub-sector service area of access device 107. As has been described, the prospective network performance information may include a prospective performance parameter and value, a probability value, and a confidence value. The prospective network performance information may include other context information, such as time period, geographic area, network element, etc., of relevance.

Network performance device 125 may transmit the prospective network performance information 320 to network provisioning device 127. Network provisioning device 127 may receive the prospective network performance information, and in response, compare the information with expected performance information 325. For example, network provisioning device 127 may identify the network element and/or the geographic service area of relevance and correlate this information with expected network performance information, as described herein.

Referring to FIG. 3C, network provisioning device 127 may determine whether a network modification should be executed 330. For example, network provisioning device 127 may make this determination based on a result of the comparison, policies/rules, historical network performance information, and network dependency information. According to this exemplary scenario, network provisioning device 127 may determine that a network modification should be executed, and in response, generate and transmit network modification information 335. For example, network provisioning device 127 may select a template and associated parameters that may optimally modify network resources and/or configurations such that expected network performance may be prospectively achieved by a network element or provided to a geographic area of relevance. As further illustrated, network 215 may execute a network modification 340. For example, according to an exemplary scenario, access device 107 may adjust various radio parameters pertaining to the sub-sector/zone to improve network performance prospectively. Additionally, or alternatively, the configuration of multiple network devices (e.g., an RU, a CU, and a UPF), which may or may not service the sub-sector and end device 130, may be modified.

According to other exemplary embodiments and scenarios, process 300 may include additional operations, fewer operations, and/or different operations that may be performed. For example, network provisioning device 127 may determine that a network modification is not necessary and operations 335 and 340 may not be performed.

Figure 4:
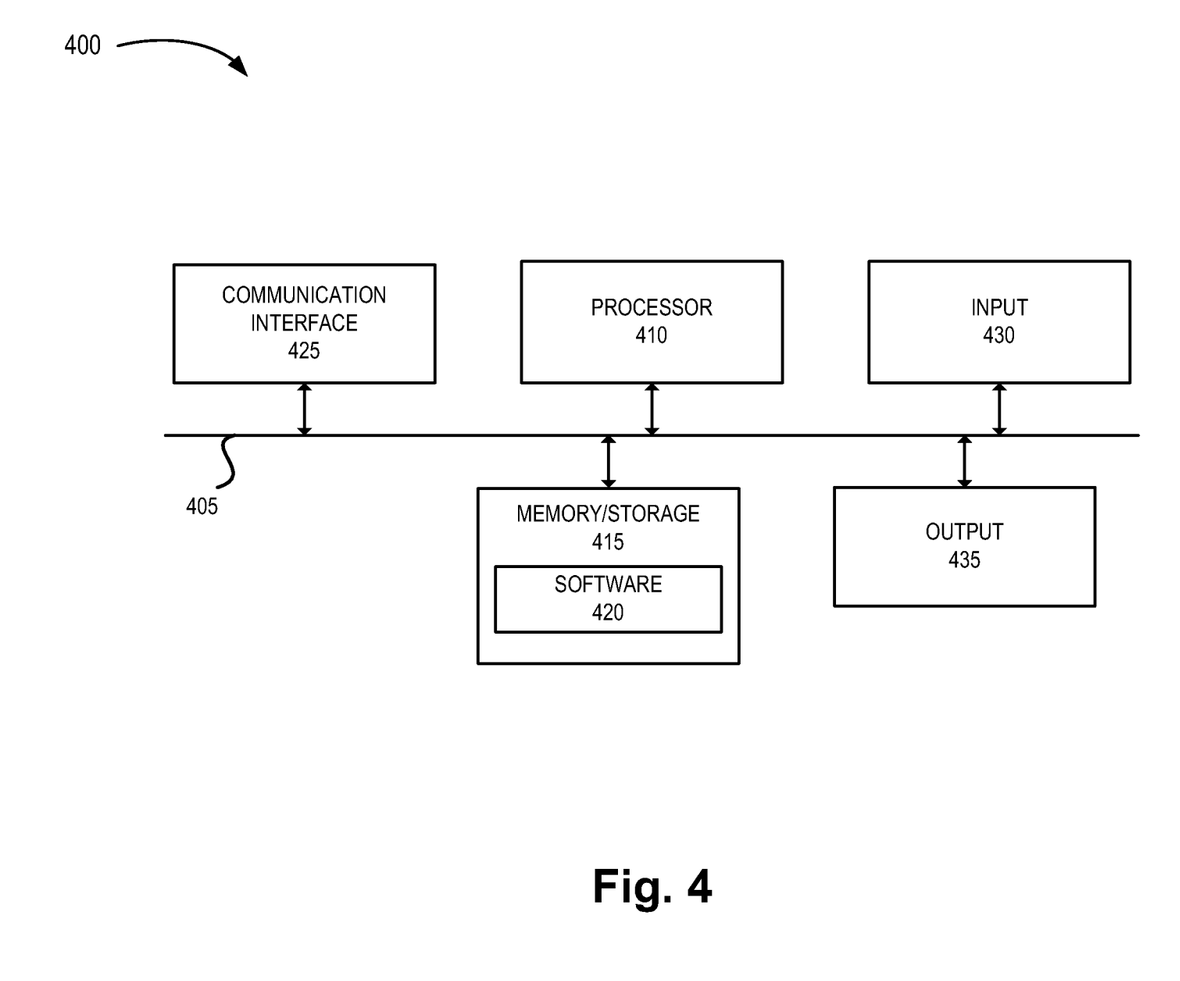
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, network performance device 125, network provisioning device 127, end device 130, AI/ML system 205, NWDAF 220, crowd sourced device 225, testing device 230, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to AI/ML system 205, software 420 may include an application that, when executed by processor 410, provides a function and/or a process of network performance and management service, as described herein. Additionally, for example, with reference to network provisioning device 127, software 420 may include an application that, when executed by processor 410, provides a function and/or a process of network performance and management service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
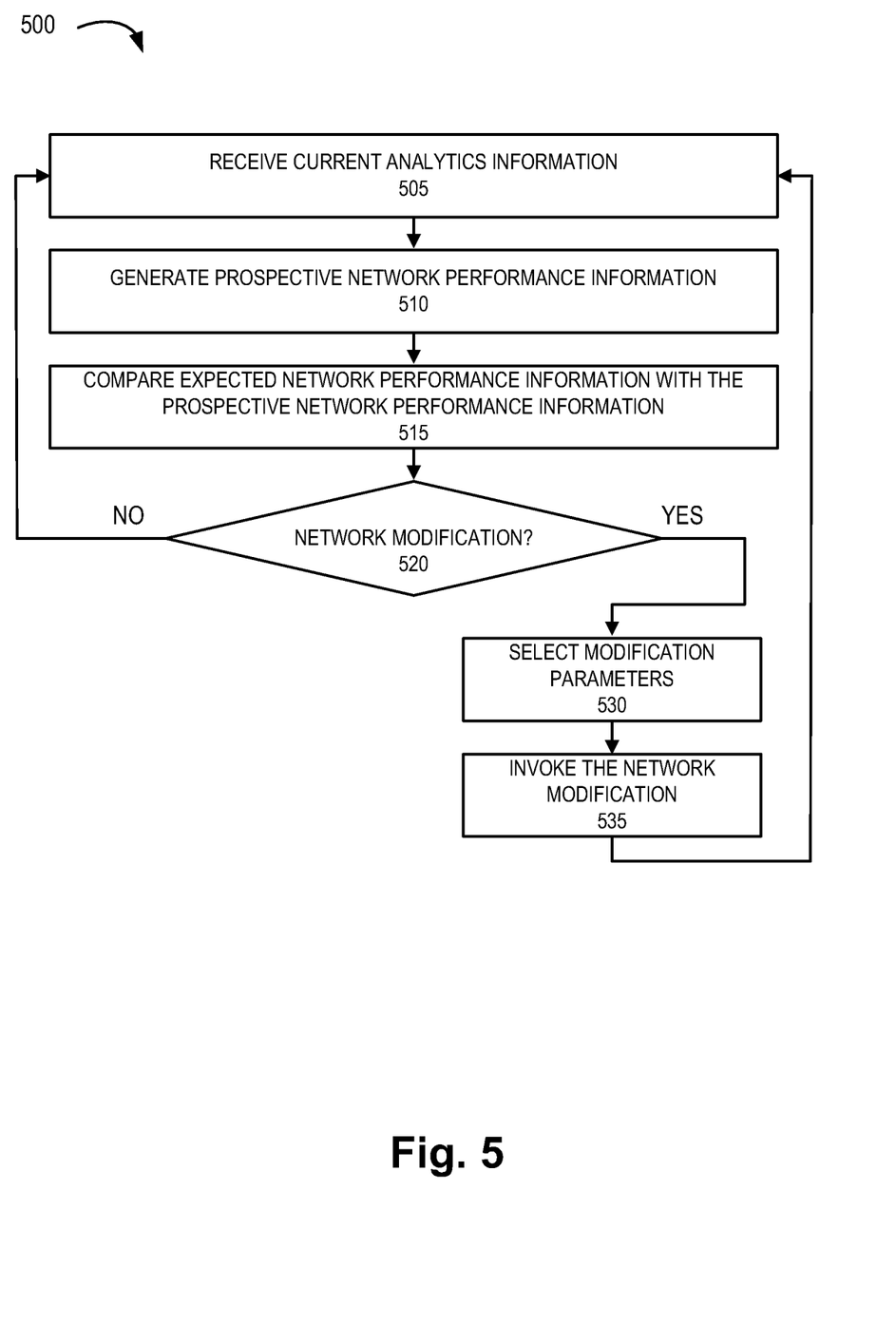
FIG. 5 is a flow diagram illustrating another exemplary process of an exemplary embodiment of the network performance and management service.

FIG. 5 is a flow diagram illustrating an exemplary process 500 of an exemplary embodiment of the network performance and management service. According to an exemplary embodiment, network performance device 125 may perform a step of process 500. According to an exemplary embodiment, network provisioning device 127 may perform a step of process 500. According to an exemplary implementation, processor 410 executes software 420 to perform a step of process 500, as described herein. Alternatively, a step may be performed by execution of only hardware.

In block 505, network performance device 125 may receive current analytics information. For example, the current analytics information may include a performance metric parameter and a value relating to a network element and/or a geographic area within which a service is provided, as described herein. The current analytics information may include time period information.

In block 510, network performance device 125 may generate prospective network performance information. For example, network performance device 125 may generate the prospective network performance information that includes a prospective network performance parameter and value, a probability value, and a confidence value, as described herein. The prospective network performance information may pertain to the network element and/or the geographic area.

In block 515, network provisioning device 127 may compare the prospective network performance information to an expected network performance information, as described herein.

In block 520, network provisioning device 127 may determine whether a network modification should be executed. For example, when the prospective network performance information may satisfy the expected network performance information, network provisioning device 127 may determine to not invoke a network modification (block 520—NO). Process 500 may return to block 505. When the prospective network performance information may not satisfy the expected performance information, network provisioning device 127 may determine to invoke a network modification (block 520—YES), in which network provisioning device 127 may select network modification parameters (block 530). For example, network provisioning device 127 may select a template that optimally addresses the network performance associated with the network element and/or the geographic area.

In block 535, network provisioning device 127 may invoke the network modification. For example, network provisioning device 127 may transmit the parameters and/or provision network resources and/or network configurations. The network modification may be executed based on the invocation.

FIG. 5 illustrates an exemplary process of the network performance and management service, according to other exemplary embodiments, the network performance and management service may perform additional operations, fewer operations, and/or different operations than those illustrated and described As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a network device, current network analytics information pertaining to at least one of a network element or a geographic service area;
    calculating, by the network device based on the current network analytics information, prospective network performance information of the at least one of the network element or the geographic service area, wherein the prospective network performance information includes a performance metric parameter, a prospective performance metric value of the performance metric parameter, a probability value pertaining to the prospective performance metric value, and a confidence value pertaining to the probability value;
    comparing, by the network device, the prospective network performance information to expected network performance information pertaining to the at least one of the network element or the geographic service area; and
    determining, by the network device based on the comparing, that a network modification is to be executed.

2. The method of claim 1, wherein the geographic service area is a sub-sector associated with a radio access network device.

3. The method of claim 1, wherein the network element includes one of a network device, a network slice from end-to-end, or a segment network path of the network slice.

4. The method of claim 1, wherein the performance metric parameter and the prospective performance metric value relate to at least one of latency, throughput, bit rate, or error rate of a future time period, and wherein the expected network performance information includes an expected performance metric that relates to the at least one of latency, throughput, bit rate, or error rate associated with a service level agreement requirement.

5. The method of claim 1, wherein the calculating further comprises:
    calculating, by the network device, the prospective network performance information based on the current network analytics information, network topology information including geographic coordinates associated with the at least one of the network element or the geographic service area, and crowd sourced data.

6. The method of claim 1, further comprising:
    determining, by the network device based on the comparing, that the prospective network performance information does not satisfy the expected network performance information.

7. The method of claim 1, further comprising:
    selecting, by the network device based on the determining, at least one of a network resource or a configuration to be modified; and
    invoking, by the network device, an execution of the network modification according to the selecting.

8. The method of claim 7, wherein the selecting is further based on network dependency information associated with the at least one of the network element or the geographic service area.

9. A network device comprising:
    a processor that is configured to:
    receive current network analytics information pertaining to at least one of a network element or a geographic service area;
    calculate, based on the current network analytics information, prospective network performance information of the at least one of the network element or the geographic service area, wherein the prospective network performance information includes a performance metric parameter, a prospective performance metric value of the performance metric parameter, a probability value pertaining to the prospective performance metric value, and a confidence value pertaining to the probability value;
    compare the prospective network performance information to expected network performance information pertaining to the at least one of the network element or the geographic service area; and
    determine, based on the comparison, that a network modification is to be executed.

10. The network device of claim 9, wherein the geographic service area is a sub-sector associated with a radio access network device.

11. The network device of claim 9, wherein the network element includes one of a network device, a network slice from end-to-end, or a segment network path of the network slice.

12. The network device of claim 9, wherein the performance metric parameter and the prospective performance metric value relate to at least one of latency, throughput, bit rate, or error rate of a future time period, and wherein the expected network performance information includes an expected performance metric that relates to the at least one of latency, throughput, bit rate, or error rate associated with a service level agreement requirement.

13. The network device of claim 9, wherein when calculating, the processor is further configured to:
    calculate the prospective network performance information based on the current network analytics information, network topology information including geographic coordinates associated with the at least one of the network element or the geographic service area, and crowd sourced data.

14. The network device of claim 9, wherein the processor is further configured to:
    determine, based on the comparison, that the prospective network performance information does not satisfy the expected network performance information.

15. The network device of claim 9, wherein the processor is further configured to:
- select, based on the determination, at least one of a network resource or a configuration to be modified; and
- invoke an execution of the network modification according to the selection.

16. The network device of claim 9, wherein the selection is further based on network dependency information associated with the at least one of the network element or the geographic service area.

17. A non-transitory computer-readable storage medium storing instructions executable by a processor of a network device, wherein the instructions are configured to:
- receive current network analytics information pertaining to at least one of a network element or a geographic service area;
- calculate, based on the current network analytics information, prospective network performance information of the at least one of the network element or the geographic service area, wherein the prospective network performance information includes a performance metric parameter, a prospective performance metric value of the performance metric parameter, a probability value pertaining to the prospective performance metric value, and a confidence value pertaining to the probability value;
- compare the prospective network performance information to expected network performance information pertaining to the at least one of the network element or the geographic service area; and
- determine, based on the comparison, that a network modification is to be executed.

18. The non-transitory computer-readable storage medium of claim 17, wherein the geographic service area is a sub-sector associated with a radio access network device.

19. The non-transitory computer-readable storage medium of claim 17, wherein the network element includes one of a network device, a network slice from end-to-end, or a segment network path of the network slice.

20. The non-transitory computer-readable storage medium of claim 17, wherein the instructions are further configured to:
- determine, based on the comparison, that the prospective network performance information does not satisfy the expected network performance information.

* * * * *